Sept. 6, 1955  K. B. SORENSEN ET AL  2,716,855
PLURAL CONNECTION IMPLEMENT HITCH DEVICE
Filed Jan. 24, 1952  3 Sheets-Sheet 3

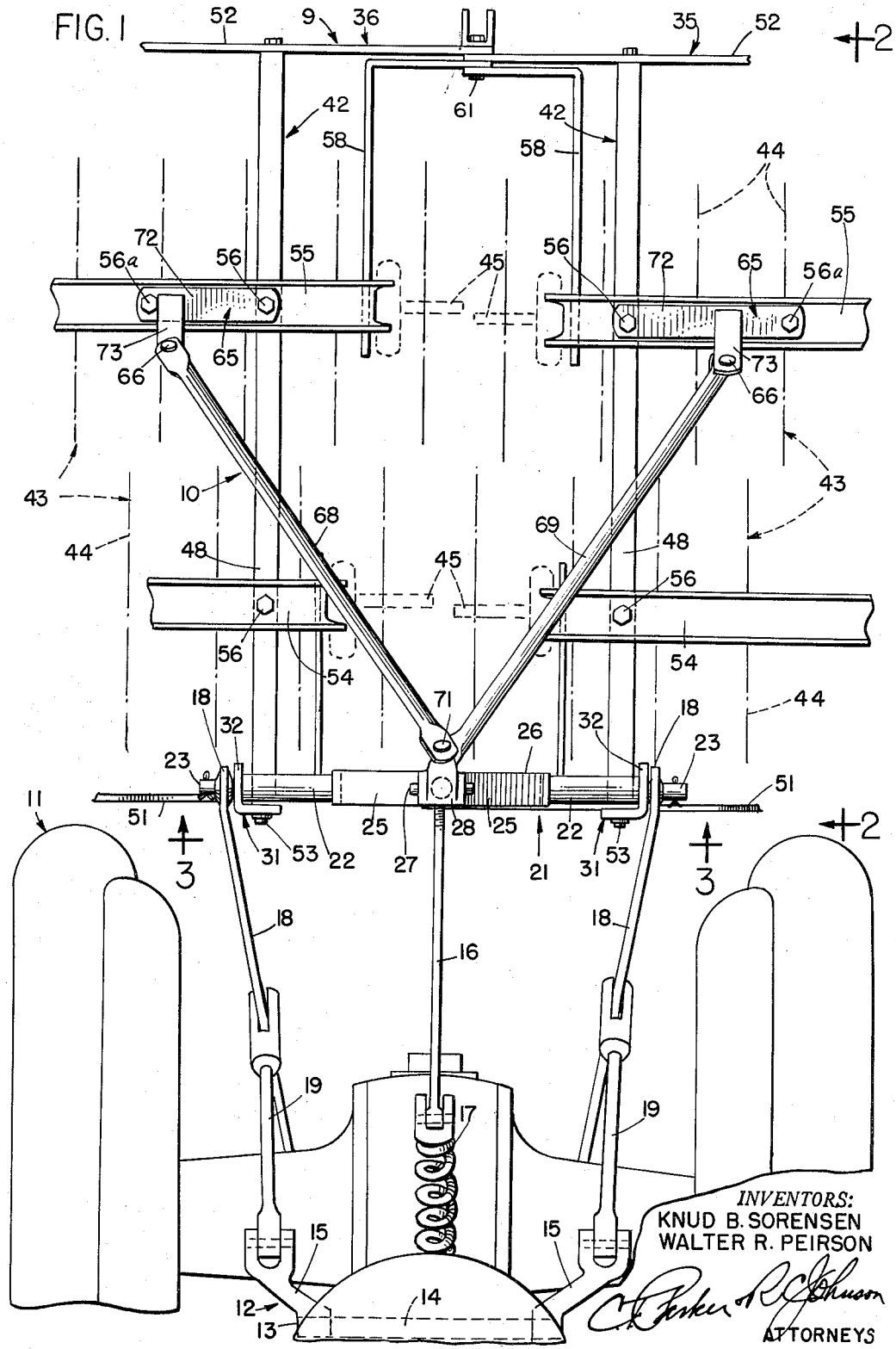

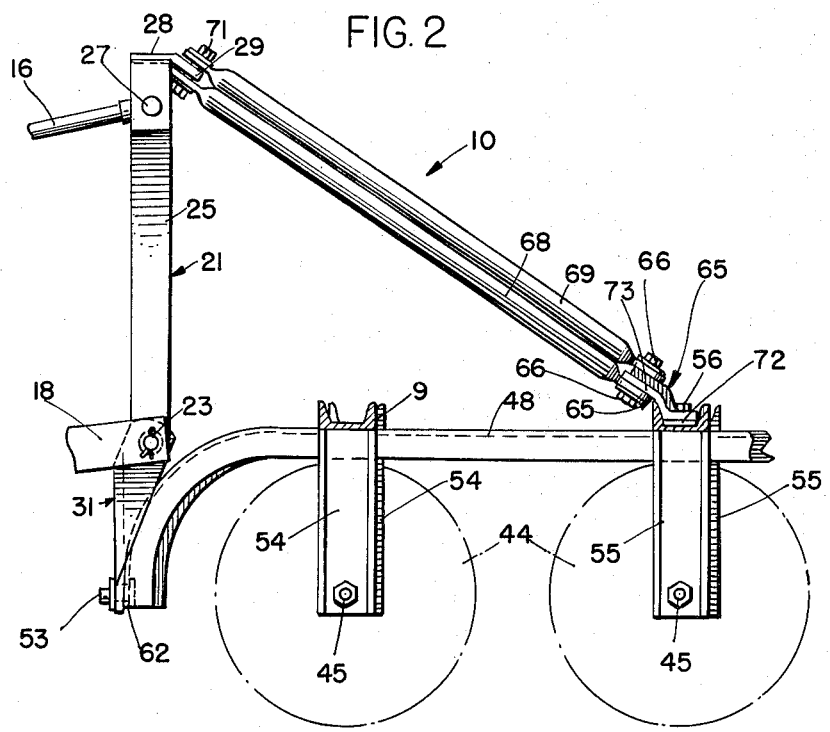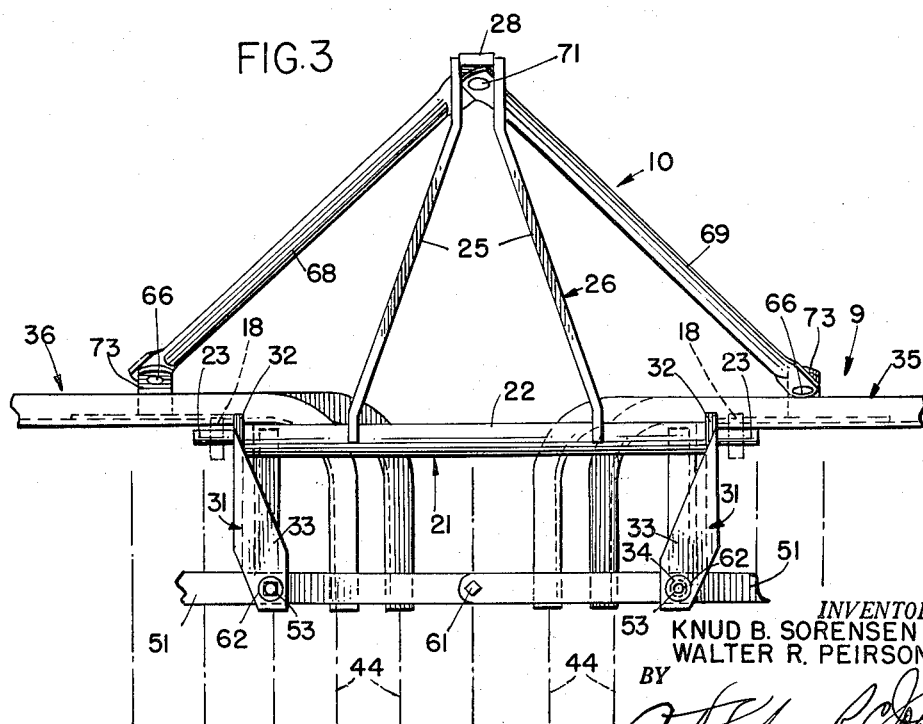

INVENTORS:
KNUD B. SORENSEN
WALTER R. PEIRSON
BY
ATTORNEYS

United States Patent Office 2,716,855
Patented Sept. 6, 1955

2,716,855

PLURAL CONNECTION IMPLEMENT HITCH DEVICE

Knud B. Sorensen, Rock Island, and Walter R. Peirson, Moline, Ill., assignors to Deere & Company, Moline, Ill., a corporation of Illinois Application January 24, 1952, Serial No. 268,088

11 Claims. (Cl. 55—126)

The present invention relates generally to agricultural implements and is especially concerned with means for connecting implements to a propelling tractor, whereby the implements may readily and quickly be attached and detached.

The object and general nature of the present invention is the provision of new and improved hitching means for connecting an implement to the rear ends of a tractor equipped with upper and lower implement-receiving connections. More specifically, it is an important feature of this invention to provide new and improved hitch means especially adapted for connecting implements having articulated sections to the rear portions of upper and lower tractor connections of the type mentioned above. According to the principles of the present invention, our hitch means is so constructed and arranged that, while accommodating relative movement between the sections in operation, as is desirable to permit the implement to follow uneven ground surfaces, when the implement is raised by operation of the tractor lift mechanism into a transport position, the articulated sections are held in a substantially level or horizontal position with no tendency for the sections to tilt about any axis. If one portion of either section were permitted to tip downwardly, ground clearance in the transport position would be materially reduced. This is prevented by the hitch mechanism of the present invention.

These and other objects of this invention will be apparent to those skilled in the art after a consideration of the following detailed description, taking in conjunction with the accompanying drawings, in which:

Figure 1 is a plan view of a hitch device in which the principles of the present invention have been incorporated.

Figure 2 is a sectional view taken generally along the line 2—2 of Figure 1.

Figure 3 is a view taken generally along the line 3—3 of Figure 1 with the compression and draft links omitted in the interests of clarity.

Figure 4:
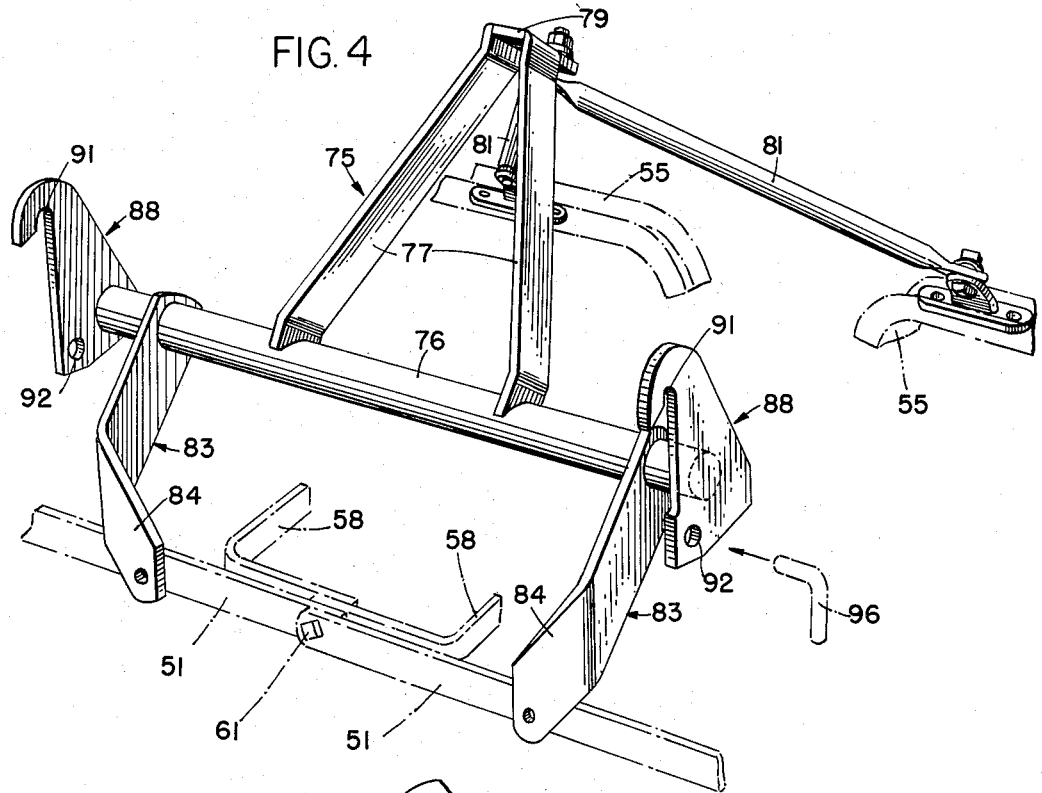
Figure 4 is a perspective view of a modified form of the present invention.

Referring first to Figures 1 and 2, the present invention has been shown by way of illustration as incorporated in a hitch device 10 particularly adapted to connect a rotary hoe implement 9 to a farm tractor. As illustrated, the tractor 11 is provided with power lift means 12 controlled by a hand lever 13 and having a rockshaft 14 on which a pair of lift arms 15 are fixed. The power lift mechanism 12 is controlled by the draft which the implement imposes on the tractor, the draft of the implement reacting through an upper compression link 16 against a spring biased part 17 to operate the power lift. The tractor 11 also includes lower draft or tension links 18 which are connected through lifting links 19 with the power lift arms 15. The upper and lower links 16 and 18 are connected with the tractor for both lateral as well as vertical swinging movement, as by ball and socket connectors and the like.

The hitch device 10 of the present invention is particularly adapted for connection to the upper and lower links 16 and 18 and includes a hitch frame 21 and means connecting the latter to the implement. The hitch frame 21 comprises a lower transverse crossbar 22, the ends 23 of which are reduced in diameter so as to provide for ready connection with the rear ends of the lower tension or draft links 18, and secured at the lower ends to the generally central portion of the crossbar 22 is a pair of upwardly converging bars 25, forming a mast 26, the upper ends of which are disposed in fairly closely spaced parallel relation, such ends being apertured to receive the pin 27 of a ball and socket type of connector which normally is carried at the rear end of the upper compression link 16. The rear ends of the tractor links 18 have similar connectors with which the reduced ends 23 of the crossbar 22 cooperate. The upper ends of the bars 25 are securely fixed, as by welding, to a lug 28, the rear portion of which extends rearwardly and downwardly, as shown at 29, and is apertured to receive pivot means described below. Secured to each end of the crossbar 22, closely adjacent the reduced portion 23, is a depending implement-receiving bracket 31. Each bracket 31 includes a fore-and-aft extending upper section 32 apertured to receive the end of the crossbar 22, the two parts being welded or otherwise firmly connected together, and each bracket 31 also includes a transversely extending lower section 33, the lower portion of which is apertured, as at 34, to receive pivot means, referred to below, by which an implement may be connected to the brackets 31.

The implement 9 shown in the drawings by way of illustration as connected to the tractor is a rotary hoe, and includes two hingedly interconnected rotary hoe sections 35 and 36, these sections being identical and generally like the rotary hoe sections shown in the Rasmussen et al. patent, 2,334,842, issued November 23, 1943, to which reference may be made if necessary. Briefly, each of the rotary hoe sections 35 and 36 comprises a frame 42 and two sets 43 of rotary hoe wheels 44, the wheels of each set being mounted on a transverse shaft 45. The rotary hoe section frame 42 includes two longitudinally extending arch members 48, each having front and rear down-turned ends to which front and rear crossbars 51 and 52 are fixed, as by bolt means 53. The frame 42 also includes a pair of fore-and-aft spaced apart transverse arch members 54 and 55 secured, as at 56, to the fore-and-aft extending arch members 48 and having down-turned ends carrying bearing means in which the hoe wheel shafts 45 are mounted for rotation. The ends of the front and rear crossbars 51 and 52 extend laterally inwardly beyond the laterally inner fore-and-aft extending arch member 48 and receive the adjacent legs of L-shaped braces 58, with the legs thereof disposed in spaced apart relation with the adjacent end of the associated crossbar 51 or 52. The other leg of each of the L-shaped braces 58 is connected with the associated hoe wheel shaft bearing. The front and rear crossbars 51 and 52, together with the associated braces 58, are hingedly connected with the inner ends and associated braces of the crossbars of the adjacent hoe wheel section by pivot bolts 61, whereby these hoe wheel sections 35 and 36 are hingedly connected together in articulated relation.

The hitch device 10 of the present invention is pivotally interconnected with the two hoe sections 35 and 36 by means of the depending brackets 31 mentioned above. Preferably, a bushing 62 is loosely disposed within the opening 34 in each of the depending brackets 31 and receives the forward laterally inner bolt 53 that connects the forward crossbar 51 with the forward ends of the fore-and-aft extending hoe wheel frame arch members 48, the bolts 53 being made extra long, if necessary, for this purpose. An attaching bracket 65 is pivotally connected, as by bolt and bushing means 66, to the lower end of each of a pair of rearwardly and downwardly diverging brace members 68 and 69. The upper ends of the members 68 and 69 are connected by bolt and bushing means 71 to the rearwardly and downwardly extended section 29 of the member 28 that is rigidly secured, as by welding, to the upper ends of the hitch frame bars 25. Each bracket 65 includes a bar 72 and an upwardly and forwardly extending lug 73. The latter is apertured to receive a pivot 66 by which the associated brace bar, 68 or 69, is pivotally connected therewith. Bolts 56 and 56a fix each bracket 65 to the associated frame bar 55.

The bolt and bushing means 66 and 71 are provided with sufficient looseness so that, when the outfit is in operation, the hoe wheel sections 35 and 36 may swing generally about a fore-and-aft extending axis, as defined by the pivot members 61, relative to the tractor-carried hitch frame 21 while, at the same time, the rearwardly and downwardly extending brace bars 68 and 69 hold the rear portions of the implement sections 35 and 36 in their proper operating positions, usually level with respect to the front portions of the implement sections, whereby the front and rear hoe wheels 43 operate at substantially the same depth.

When the tractor power lift mechanism 12 is operated to raise the implement into a transport position, the two hoe sections are suspended in a stable position and in such equilibrium, one with respect to the other, that the hoe sections normally remain in a substantially level position, substantially just as if each unit were suspended at a point directly above its center of gravity. In providing the present hitch device so as to hold the implement in a transport position and retaining the hingedly interconnected sections in equilibrium in a horizontal or level position, it is considered that the sustaining forces, acting through the links 68 and 69, are applied to the implement sections, respectively, at points outwardly of the interconnected end portions thereof so that forces involved are balanced, or in equilibrium, when the sections are level, and any tendency for the outer portions of the implement sections to tip downwardly out of level position is effectively resisted.

Figure 5:
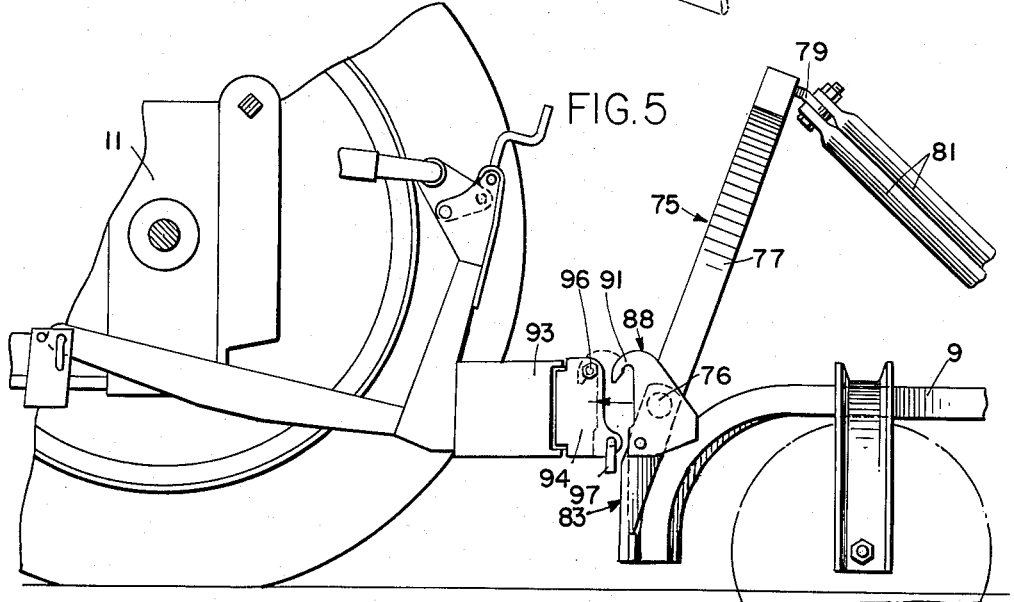
Figure 5 is a fragmentary side view of the form of the invention shown in Figure 4, illustrating the tractor drawbar device with which this form of the present invention is particularly adapted to be used.

A slightly modified form of the present invention is shown in Figure 4. Referring now to this figure, the hitch frame is indicated in its entirety by the reference numeral 75 and includes a crossbar 76 and a pair of upwardly converging bars 77, the upper ends of which are securely interconnected by a lug 79, preferably welded to the bars 77, and having an apertured extension to receive downwardly and rearwardly diverging brace bars 81, which are substantially the same as the bars 68 and 69 described above. A pair of depending implement-receiving brackets 83 are fixed at their upper ends to the end portions of the crossbar 76, and at their downward portions have lateral extensions 84 which are apertured to receive the implement pivot members 53. Also fixed to the end portions of the crossbar 76 is a pair of attaching brackets 88. Each of these brackets 88 is provided with an upper hook portion 91 and a lower apertured section 92, each bracket being shaped to cooperate with a tractor-carried implement-attaching structure of the type shown in Figure 5. Attaching structure of this type, which is conventional so far as the present invention is concerned, includes a pair of sway links 93 suitably connected at their forward ends with the tractor and carrying at their ends a pair of couplers 94, each made up of a pair of laterally spaced apart vertical plates which support upper and lower coupler pins 96 and 97, the latter being a quick detachable pin and the two pins of each pair being spaced and arranged to receive the coupling brackets 88. The hook portions 91 are adapted to embrace the upper pins 96 while the lower apertured portions 92 are disposed in registry with and are adapted to receive the quick-detachable pins 97 extending through the openings in the lower portions of the coupler plates 94. An attaching structure of this type is shown in U. S. Patent No. 2,616,349, issued November 4, 1952, to Lindeman et al.

By virtue of the novel principles included in the construction of the hitch devices of the present invention, an articulated implement, such as a pair of rotary hoe sections, may be supported for transport in a level or horizontal position, and with no tendency to move out of that position, yet the desired hinging or articulating action of the implement sections, as when the implement operates over uneven ground, is readily accommodated.

While we have shown and described above the preferred structure in which the principles of the present invention have been incorporated, it is to be understood that our invention is not to be limited to the particular details, shown and described above, but that, in fact, widely different means may be employed in the broader aspects of our invention.

What we claim, therefore, and desire to secure by Letters Patent is:

1. A hitch device for connecting an implement, having articulated transversely extending sections, hingedly connected for relative movement about a generally fore-and-aft extending axis or axes, to a tractor or the like, said hitch device comprising a vertical hitch frame having upper bar-receiving means and a pair of laterally spaced apart brackets adjacent the lower portion of said frame, generally fore-and-aft extending pivot means on the lower portions of said brackets for pivotally connecting the forward laterally inner portions of said implement sections with said brackets, and a pair of bars connected at their upper and forward ends to said bar-receiving means for generally lateral swinging movement relative thereto and extending downwardly, rearwardly and outwardly therefrom for pivotal connection at their rear ends with the implement sections generally laterally outwardly of said axis or axes, whereby, when the implement is raised into transport position, said interconnected sections are suspended in equilibrium in a substantially level position.

2. A hitch device for connecting an implement with a tractor or the like, said hitch device comprising a hitch frame adapted to be disposed generally vertically and including a crossbar having means at its ends to receive laterally spaced draft means, a pair of upwardly converging bars fixed at their lower ends to said crossbar in laterally spaced apart relation, and a depending implement-receiving bracket fixed at its upper end to each end of said crossbar, a pair of implement-receiving bars, generally upwardly and rearwardly extending pivot means connecting said bars at their forward ends with the upper portions of said upwardly converging bars, whereby said implement bars extend generally laterally outwardly, downwardly and rearwardly from said bracket, and implement-receiving means pivotally connected with the rear ends of said implement-receiving bars and connectible with an implement.

3. A hitch device for connecting an implement with a tractor having a pair of lower tension links and an upper compresion link connected at their forward ends to the tractor, said hitch device comprising a hitch frame adapted to be disposed generally vertically and including a crossbar having means at its ends to receive the rear ends of said tension links, a pair of upwardly converging bars fixed at their lower ends to said crossbar in laterally spaced apart relation and having means at their upper ends to receive the rear end of said upper compression link, and a depending implement-receiving bracket fixed at its upper end to each end of said crossbar, a part fixed to the upper ends of said upwardly converging bars and including a rearwardly extending section, each of said brackets having a lower section adapted to receive implement-connecting means, a pair of bars swingably connected with the rearwardly extending section of said part and adapted to extend generally rearwardly and outwardly therefrom, and means at the rear end of each of said bars for swingably connecting the bar with the rear portion of said implement.

4. A hitch device for connecting an implement having articulated transversely extending sections, hingedly connected for relative movement about a generally fore-and-aft extending axis or axes, to a tractor having upper and lower links, said hitch device comprising a vertical hitch frame having upper and lower link-receiving means and a pair of laterally spaced apart brackets adjacent the lower portion of said frame, means for pivotally connecting the forward laterally inner portions of said implement sections with said brakets, a pair of bars swingably connected at their upper and forward ends to the upper portion of said hitch frame and extending downwardly, rearwardly and outwardly therefrom, and bracket means pivotally connected to the rear end of each of said bars for lateral swinging relative thereto and adapted to be connected with the implement sections rearwardly of said forward portions of said sections and laterally outwardly of said axis or axes.

5. A hitch device for connecting an implement having articulated transversely extending sections, hingedly connected for relative movement about a generally fore-and-aft extending axis or axes, to a tractor or the like, said hitch device comprising a vertical hitch frame having a pair of laterally spaced apart brackets adjacent the lower portion of said frame, generally fore-and-aft extending means for pivotally connecting the forward laterally inner portions of said implement sections with said brackets, a pair of rearwardly, downwardly and outwardly extending bars pivotally connected adjacent their upper ends with the upper part of said hitch frame for generally lateral swinging relative thereto, and means adapted to pivotally connect the lower ends of said bars with said implement sections, respectively, at points on said sections lying generally outwardly of the axis or axes of interconnection of said implement sections distances such that said sections are suspended in equilibrium from said hitch frame and in a generally horizontal position.

6. A hitch device for connecting an articulated implement, having hingedly interconnected sections, with a tractor or the like, said hitch device comprising a hitch frame adapted to be disposed generally vertically and connected with the tractor in a way to be held against tilting in a fore-and-aft direction relative to the tractor, a pair of generally rearwardly divergent bars swingably connected at their forward ends to the upper portion of said hitch frame, brackets pivotally connected to the rear ends of said generally rearwardly divergent bars, means for connecting the last mentioned brackets with said implement sections, respectively, above and laterally outwardly of the hinged connection between said sections, whereby, when the implement is raised off the ground, said sections are suspended generally horizontally, a pair of laterally spaced apart, implement-receiving brackets fixed to the lower portion of said hitch frame, means on the lower portions of said hitch frame for connecting the front portions of said implement to said hitch frame, and means connected with the lower portion of said hitch frame for receiving the draft-transmitting connections of the tractor.

7. A hitch device for connecting an articulated implement, having hingedly interconnected sections, with a tractor having upper and lower implement-connecting means, whereby the implement is held by the tractor against tilting in a generally fore-and-aft direction, said hitch device comprising a hitch frame adapted to be disposed generally vertically and including a crossbar, means at the ends of said crossbar to receive said tractor connections, a depending implement-receiving bracket fixed to said crossbar adjacent the ends thereof, means for connecting each bracket with the forward inner portion of the associated implement section, a pair of upper implement-receiving bars swingably connected at their forward ends with the upper portion of said hitch frame, and means for swingably connecting the rear ends of said bars with the rear laterally inner portions of said implement sections, respectively.

8. A hitch device comprising a normally upright hitch frame, including a crossbar and an upwardly extending bar means, said crossbar extending laterally outwardly of said upwardly extending bar means, draft-receiving means on the end portions of said crossbar, depending brackets on said crossbar disposed laterally inwardly of said draft-receiving means and laterally outwardly of said upwardly extending bar means, a pair of rearwardly, downwardly and laterally outwardly extending links, means pivoting the forward ends of said links for individual generally lateral swinging movement relative to the upper portion of said bar means, and an implement-receiving means pivoted to the rear end of each of said links.

9. In an agricultural machine, the combination with an implement comprising a pair of sections normally disposed in side-by-side relation, and means pivotally interconnecting said sections for relative movement about a generally fore-and-aft extending axis, of a hitch device for connecting said implement with a propelling tractor or the like, comprising a generally upright hitch frame means, pivot means connecting said implement sections on each side of said axis, with said frame means, a pair of suspension links extending generally downwardly outwardly and rearwardly from said hitch frame means, pivot means connecting the front ends of said links with said hitch frame, and pivot means connecting the rear ends of said links with said rear portions of said implement sections, each of said pivot means including relatively loosely associated parts whereby each of said pivot means provides for relative movement of the associated parts about more than one axis.

10. In an agricultural machine, the combination with an implement comprising a pair of sections normally disposed in side-by-side relation, and means pivotally interconnecting said sections for relative movement about a generally fore-and-aft extending axis disposed substantially centrally between said sections, of a hitch device for connecting said implement with a propelling tractor or the like, comprising a generally upright hitch frame means, pivot means connecting said implement sections with said frame means on each side of said axis, a pair of suspension links extending generally downwardly, outwardly and rearwardly from said hitch frame means, and means swingably connected with each of said suspension links at opposite ends thereof for connecting said links with said hitch frame means and said implement sections for generally lateral swinging relative thereto.

11. In an agricultural machine, the combination with an implement comprising a pair of sections normally disposed in side-by-side relation, and means pivotally interconnecting said sections for relative movement about a generally fore-and-aft extending axis, of a hitch device for connecting said implement with a propelling tractor or the like, comprising a generally upright hitch frame means, pivot means connecting said implement sections on each side of said axis, with said frame means, a pair of suspension links extending generally downwardly, outwardly and rearwardly from said hitch frame means and swingably connected at opposite ends with said hitch frame means and said implement sections for generally lateral swinging relative thereto, said hitch frame means including a crossbar fixed thereto and downwardly extending brackets fixed to said crossbar and having generally fore-and-aft extending pivot-receiving apertures, pivot means disposed therein for connecting said implement sections to the hitch frame means for pivoting relative thereto about generally fore-and-aft extending axes, and a bracket pivoted to the rear end of each suspension link and attached to the associated implement section above and laterally outwardly of said axis.

References Cited in the file of this patent

UNITED STATES PATENTS

| | | |
|---|---|---|
| 1,900,440 | Ferguson | Mar. 7, 1933 |
| 2,341,807 | Olmstead et al. | Feb. 15, 1944 |
| 2,440,550 | Martin | Apr. 27, 1948 |
| 2,510,179 | Johnson | June 6, 1950 |
| 2,527,613 | Zagurski | Oct. 31, 1950 |

FOREIGN PATENTS

| | | |
|---|---|---|
| 554,033 | Great Britain | June 16, 1943 |